United States Patent [19]

Woodland

[11] Patent Number: 4,930,189
[45] Date of Patent: Jun. 5, 1990

[54] DYNAMIC SCREENER

[76] Inventor: Sylvester L. Woodland, 975 McKinley Dr., Blackfoot, Id. 83221

[21] Appl. No.: 331,227

[22] Filed: Mar. 31, 1989

[51] Int. Cl.$^5$ .............................................. A22C 25/16
[52] U.S. Cl. .......................................... 17/46; 17/1 G
[58] Field of Search ............................. 17/46, 26, 1 G; 426/448, 549, 430

[56] References Cited

U.S. PATENT DOCUMENTS 3,629,902 12/1971 Leonard ................................ 17/1 G
3,999,248 12/1976 Mauer et al. ............................ 17/46

FOREIGN PATENT DOCUMENTS 149900 8/1981 Fed. Rep. of Germany .......... 17/46

Primary Examiner—Willis Little
Attorney, Agent, or Firm—Warren F. B. Lindsley

[57] ABSTRACT

A screening apparatus is provided for removing cartiledge, gristle and bone fragments from a ground moist product such as ground meat, the screening process comprising a form of extrusion between closely spaced helically corrugated revolving cylinders. The corrugations have sinusoidal contours with the contours of adjacent cylinders displaced 180 degrees from each other. The cylinders all revolve in the same direction so that spacing between the adjacent cylinders remains fixed and uniform while the advancing ridges of the corrugated surfaces move the retained cartiledge, gristle and bone fragments to one end of the cylinders to be exhausted from the apparatus.

20 Claims, 3 Drawing Sheets

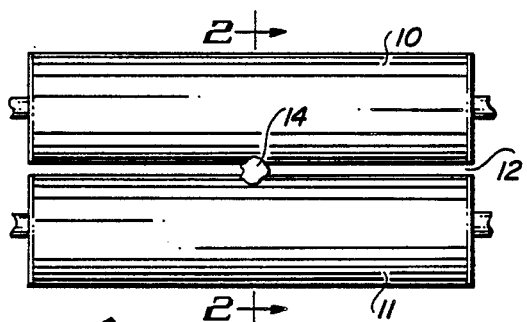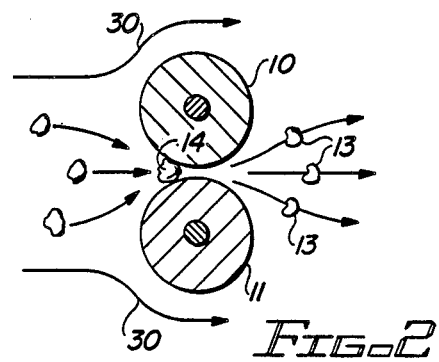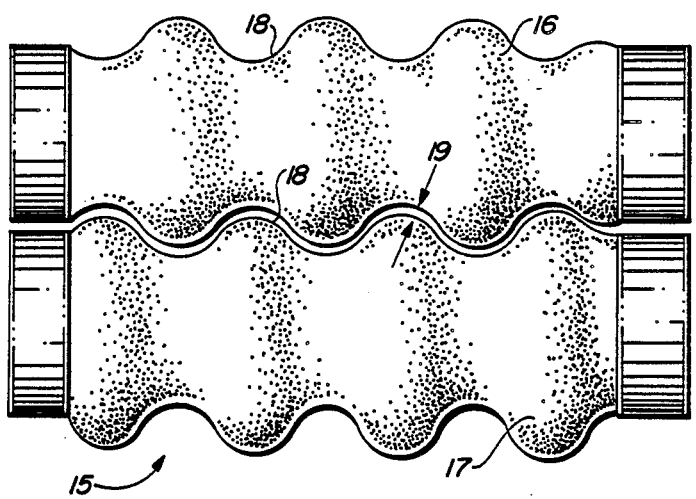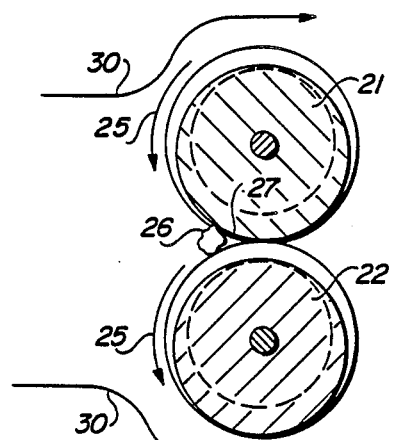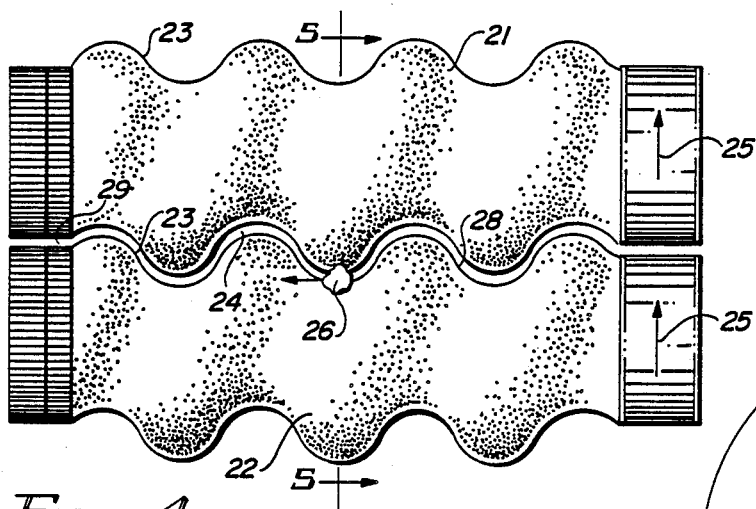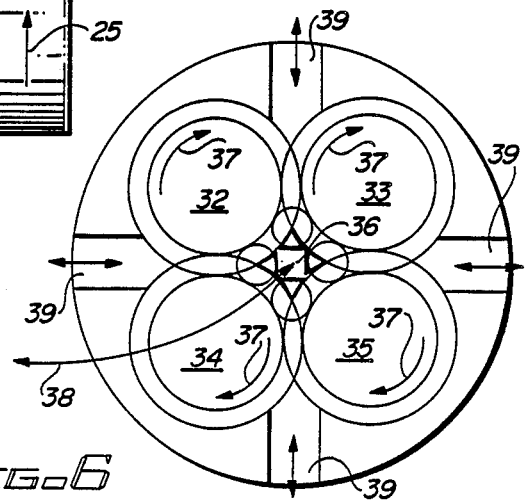

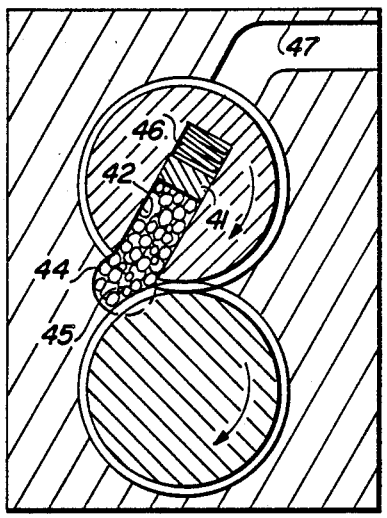
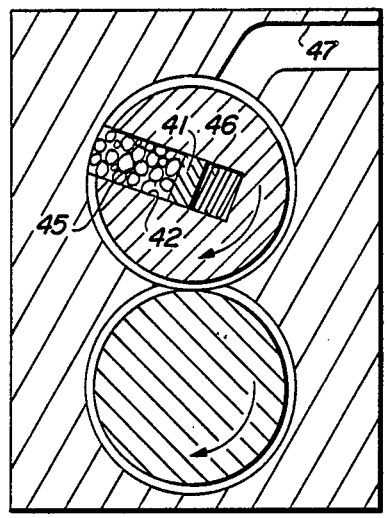
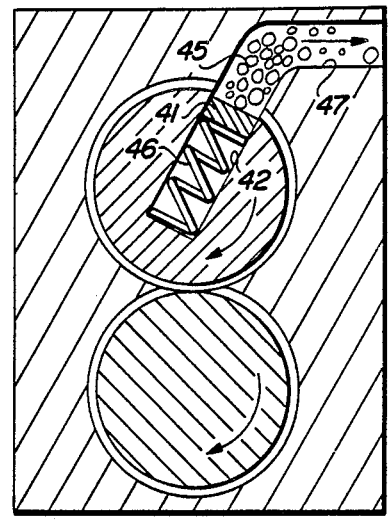
FIG. 7A     FIG. 7B     FIG. 7C
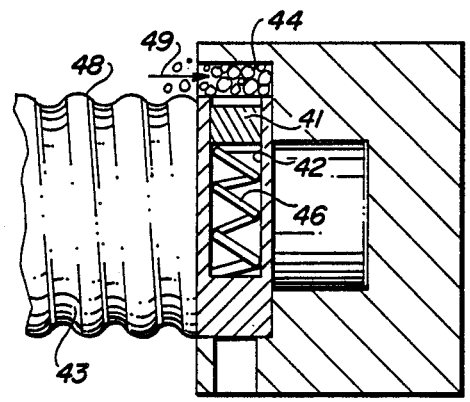
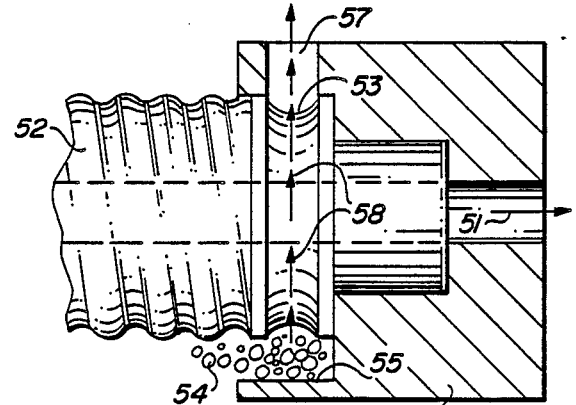
FIG. 8     FIG. 9A
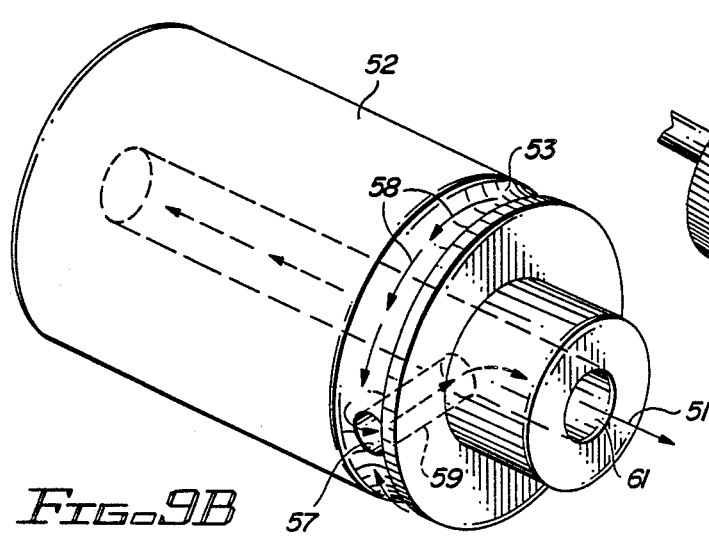
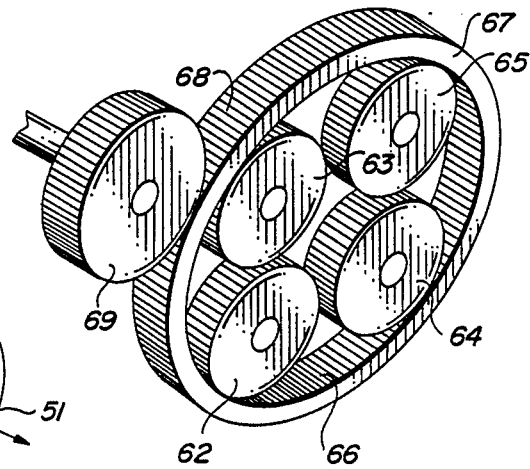
FIG. 9B     FIG. 10A

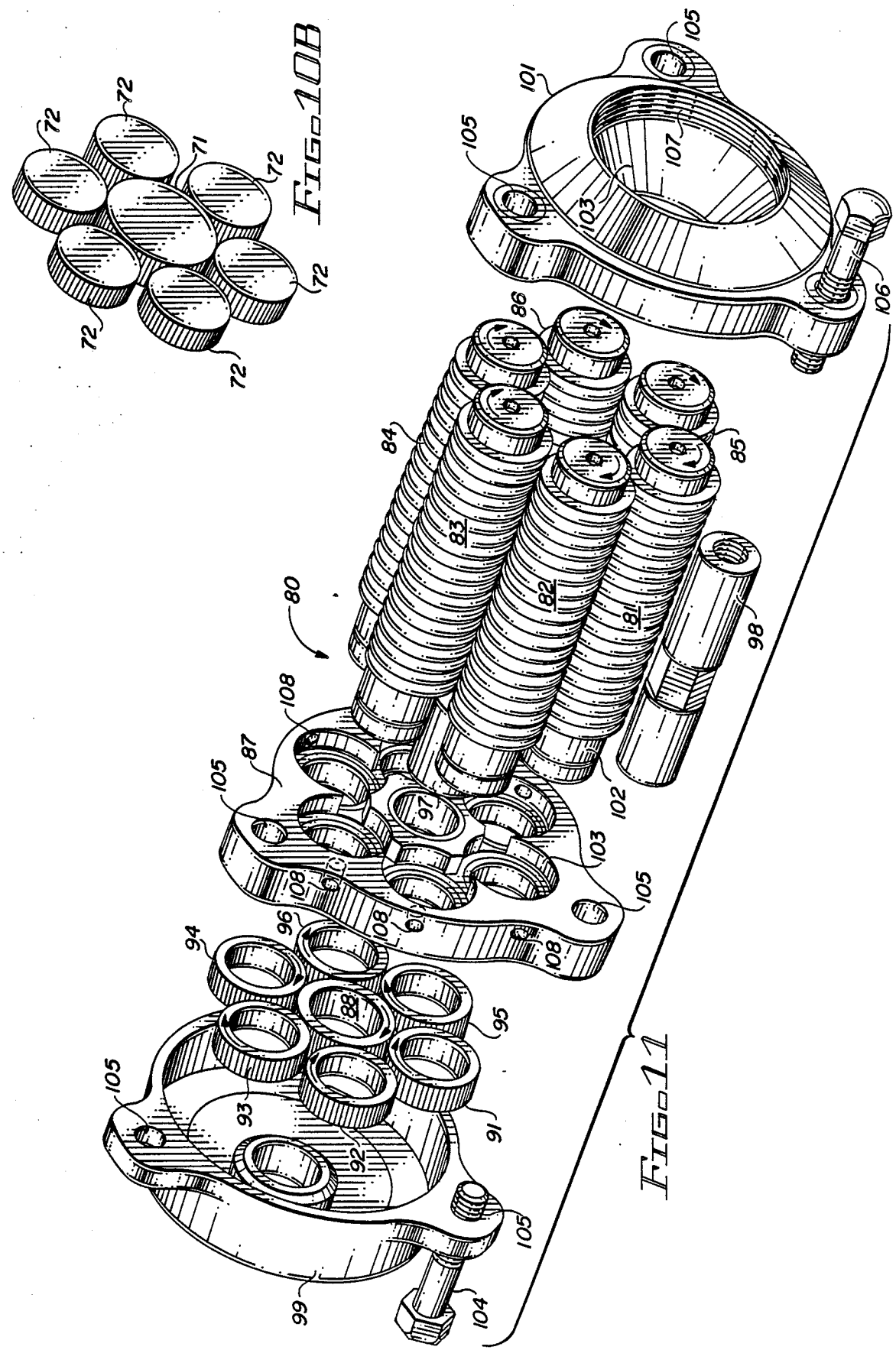

DYNAMIC SCREENER

BACKGROUND OF THE INVENTION

Many different types of products and notably food products are subjected to a screening operation at one point or another in the processing operation. Screening may be employed as a means for grading the product according to particle dimensions, or to remove unwanted materials or contaminants.

Most screening operations deal with dry products such as flour, grains, seeds and the like. For such products a simple wire mesh screen is typically employed with mesh dimensions tailored to produce optimum results for the product type and grain size involved. The dry, solid nature of such products lends itself well to this common form of screening and little difficulty is experienced with clogging or caking of the materials being screened. There are, of course, always compromises to be made in which screening effectiveness is traded off for higher rates of product flow.

The screening of moist or wet products, and particularly of moist products having a fibrous structure, presents more serious difficulties. Because the moist materials tend to cling together they must be driven through the screens under pressure. The moist fibers wrap themselves around the wires that form the mesh, and the screen quickly becomes clogged. Frequent cleaning operations are thus required. Equipment must be designed for ease of dismantling and cleaning, and unless all parts of the equipment are thoroughly cleaned each time there is always the chance of contamination due to residue that may remain over an extended period of time.

The difficulties experienced in the screening of such products are matched by the urgent desirability of screening certain products that seem to offer the most serious challenges. One such product that can benefit significantly from an effective and efficient screening process is ground meat. In this case a screening process is needed for removing cartiledge, gristle and bone fragments from the meat. As known the bone fragments can readily fracture a person's teeth or at the least cause severe pain when bitten into. In spite of all reasonable care taken to eliminate such unwanted portions of the product ahead of the grinding operation a considerable amount of cartiledge, gristle and bone fragments inevitably find their way into the finished product.

The present invention is directed toward the realization of an effective screening process for ground meats and similar materials. The invention employs a different approach to screening, taking advantage of physical differences (other than dimensional) between the meat and the cartiledge, gristle and bone particles specifically the softness and pliability of the fleshy portions as compared with the rigidity and/or semi pliability of the other identified fragments. The separation process employed is a form of extrusion in which a given particle size of meat will pass through the screen while a cartiledge, gristle and bone fragment, of equal or smaller dimensions will be retained and removed.

SUMMARY OF THE INVENTION

In accordance with the invention claimed, a new and improved screening mechanism and method of operation is provided for screening moist products such as ground meats, the nature of which renders impractical such conventional screening means as wire mesh which is typically employed for dry products.

It is, therefore, an object of the present invention to provide an improved method and means for screening moist or wet products, and more particularly for screening food products such as ground meats and the like.

A further object of the invention is to provide in such an improved screening means a capability for removing cartiledge, gristle and bone fragments from ground meats wherein the portions removed may be of equal or smaller dimensions than the meat portions that pass through the screening means and of a different relative density.

A still further object of the invention is to provide such an improved screening means in a form that takes advantage of those physical characteristics of the ground meat products versus the characteristics of cartiledge, gristle and bone fragments which have previously stood in the way of effective screening by conventional means.

A still further object of the invention is to provide in such an improved screening means a capability for exhausting the bone fragments or other undesired materials as they are collected, thereby obviating the need for frequent cleaning of the screening equipment.

A still further object of the invention is to provide such an improved screening means in a form which maximizes product flow without degrading screening quality or effectiveness.

A still further object of the invention is to provide such a screening means in a form that reduces the risk of contamination by virtue of its use of a structure that is free of pockets and crevices that might retain particles of food products in defiance of cleaning operations.

Further objects and advantages of the invention will become apparent as the following description proceeds, and the features of novelty which characterize the invention will be pointed out with particularity in the claims annexed to and forming a part of this specification.

BRIEF DESCRIPTION OF THE DRAWINGS

The present invention may be more readily described with reference to the accompanying drawings in which:

FIG. 1 is a side view of a simplified apparatus illustrative of the principle of screening moist, pliable products by the method of extrusion through the gap between two parallel cylinders;

FIG. 2 is a cross-sectional view of the apparatus of FIG. 1 as seen along line 2—2 of FIG. 1;

FIG. 3 is a side view of an improved version of the apparatus of FIGS. 1 and 2 in which the cylindrical surfaces of FIGS. 1 and 2 have been replaced by a corrugated surface;

FIG. 4 is a further improved version of the apparatus of FIGS. 1-3 in which the corrugated surface has been modified to a helical corrugated surface;

FIG. 5 is a cross-sectional view of the apparatus of FIG. 4 as seen along line 5—5 of FIG. 4;

FIG. 6 is a cross-sectional view showing an arrangement of four corrugated cylinders of the type shown in FIGS. 4 and 5 in a first embodiment of the present invention.

FIGS. 7A–7C show a mechanism for removal of unwanted particles from the screened product as employed in the dynamic screen of the invention, the three views showing successive views of the mechanism through an operating cycle;

FIG. 8 is a side view of a portion of the dynamic screen of the invention showing the incorporation of the mechanism of FIGS. 7A-7C;

FIG. 9A is a side view showing an alternate means for removal of unwanted particles from the screening apparatus;

FIG. 9B is a perspective view of one of the cylinders of the dynamic screen of the invention showing a possible removal path for the unwanted particles as removed by the means of FIG. 9A;

FIG. 10A is a perspective of a suitable gear arrangement for rotating the four cylinders of the apparatus illustrated in FIG. 6;

FIG. 10B is a perspective view of an alternate gearing arrangement for rotation of the parallel cylinders of the dynamic screen of the invention, the illustration of Fig. 10B incorporating six star gears for six parallel cylinders in another embodiment of the invention; and FIG. 11 is an exploded view of the dynamic screen of the invention showing a complete version of the apparatus.

DESCRIPTION OF THE PREFERRED EMBODIMENT

Referring more particularly to the drawings by characters of reference, FIGS. 1 and 2 illustrate the basic principle of screening through the process of extrusion. Two closely spaced parallel cylinders 10 and 11 with a narrow space 12 between their surfaces comprise a simple version of a screening arrangement of this type. When a mixture of soft, pliant particles and hard, brittle particles such as ground meat with cartiledge, gristle and/or bone fragments is forced through the space 12 between the rollers 10 and 11, the pliable meat particles 13 readily pass through the space 12, deforming as necessary, but retaining their original bulk and returning substantially to their original shapes after passage. The brittle bone fragments and/or non-pliable cartiledge and gristle 14, however, with dimensions greater than the separation of the rollers are retained at the cusp formed by the adjacent cylinders. Because of the pliability of the meat particles, the dimensions of meat particles passed by this screening arrangement may significantly exceed the dimensions of the less pliable or denser cartiledge, gristle and/or bone fragments that are held back.

One important feature or characteristic of any screening arrangement is the rate at which the screened product may be moved thorugh the screen. In the case of the extrusion screen of FIGS. 1 and 2, the rate of flow is proportional to the length of the cylinders 10 and 11, and more specifically to the longitudinal dimension of the space 12.

FIG. 3 shows an improved extrusion screen 15 employing two closely-spaced corrugated cylinders 16 and 17. The corrugated surfaces of the cylinders with contours 18 in the form of a trigonometric sine function are illustrative of a first feature of the dynamic screen of the present invention in which such a corrugated cylindrical surface is employed as a means for increasing the effective length of the space 18 between the two cylinders. It is to be noted that a uniform spacing 19 is maintained along the adjacent surfaces of the two cylinders 16 and 17 by virtue of their identically contoured surfaces being displaced 180 degrees longitudinally from each other.

Another important characteristic much to be desired in a screening apparatus is a capability for providing continuous automatic elimination of the particles that are removed from the product being screened. This is achieved in the present invention through the use of helically corrugated cylinders 21 and 22 as shown in FIGS. 4 and 5. The helically corrugated cylinders 21 and 22 are again characterized by sine function contours 23 which increase the effective length of the uniform space 24 between the two cylinders and thereby increase the potential flow rate of the screened product. The sine wave contours of the two cylinders are again displaced from each other by 180°. In addition, the two cylinders 21 and 22 are continuously rotated, both in the same direction as shown by the arrows 25. As the two cylinders are rotated in the same direction the 180 degree displacement is maintained so that the uniformity of the space 24 is also maintained along the lengths of the cylinders.

The rotation of the closely spaced helically contoured cylinders provides the means for removal of the particles that are screened from the product. When a rigid and/or less pliable denser portion of the product such as cartiledge, gristle and/or bone fragments 26 are caught in the cusp 27 formed by the converging cylindrical surfaces of the two cylinders, they will be held therein by the pressure of the screened product passing around them and through the space 24. As the cylinders rotate in the direction of the arrows 25 the ridges of the corrugated surfaces along the space 24 move steadily to the left. Pressure from the adjacent ridge 28 thus moves the cartiledge and/or gristle particle or bone fragments 26 leftward to the end 29 of space 24. Extraction of the particle 26 from this location is accomplished in the present invention by one of two methods to be described later.

In a practical implementation of the extrusion screen a means must be provided to prevent the flow of the screened product around the cylinders 21 and 22 as shown by the arrows 30 in FIGS. 2 and 5. This is accomplished in the present invention through the positioning of four or more cylinders 32-35 about a central longitudinal opening 36 as shown in FIG. 6. Adjacent cylinders are spaced apart with 180 degree displacement as described for the cylinders of FIGS. 4 and 5 and are again rotated in the same direction as indicated by the arrows 37. The product 38 to be screened may enter at the end of central opening 36, passing through the spaces between the four cylinders and leaving via the radially extending ports 39, or it may enter the ports 39, passing between the cylinders and leaving via the end or ends of opening 36. The use of the four cylinders to form a closed circle about a central opening leaves no flow path for circumvention of the screening path between the cylinders. While it is possible to form such a central opening using only three cylinders, the central opening becomes undesirably small so that the use of four or more cylinders is much to be preferred.

FIGS. 7A-7C illustrate the use of a spring-loaded valve as employed in the present invention for the removal of the collected semi and/or rigid particles from the ends of the cylinders. The valve 41 is mounted in a cavity 42 within the rotating cylinder 43. Cavity 42 opens into the region 44 at the ends of the cylinders to which the collected particles 45 are carried by the advancing ridges of the corrugated surfaces of the cylinders. The valve is urged toward the opening of cavity 42 by a spring 46, but when the cavity opens into region 44 the spring force is overcome by the pressure that is employed to drive the product through the screening cylinders. As the valve is driven back into the cavity by the product pressure, the particles move into the cavity as shown in FIG. 7A. The captured particles 45 are then carried by cavity 42 while cylinder 43 continues its rotation as shown in FIG. 7B moving cavity 42 toward a discharge port 47. In the view of FIG. 7C the cavity 42 has moved into alignment with port 47. At port 47 spring pressure drives valve 41 forward and forces the particles out of cavity 42 into discharge port 47.

FIG. 8 further illustrates the orientation of the cavity 42, valve 41 and spring 46 within the end of cylinder 43. The sinusoidally contoured corrugations 48 are seen to be tapered downward in height toward the end of the cylinder to provide additional clearance for movement of the collected particles. Movement of the particles into region 44 is indicated by arrow 49.

In some implementations of the dynamic screen of the invention it may be desirable to pass a cooling or heating fluid 51 through the centers of cylinders 52 as shown in FIGS. 9A and 9B. When a longitudinal cooling duct through the cylinder is required for this purpose there is not sufficient space remaining within the cylinder for the valve arrangement of FIGS. 7A-7C and 8. FIGS. 9A and 9B show an alternate means for removal of the collected particles in the form of an annular groove 53 about the end of cylinder 52 to which the particles are driven by the rotating cylinders. When this alternate means is used, a valving means, such as valve 41, may be used with it and mounted external of the structure shown in FIG. 9B. The particles 54 are carried into an opening 55 in the housing 56 at one side of cylinder 52 where they enter groove 53. The particles then follow groove 53 to the opposite side of cylinder 52 where they are exhausted at port 57. The arrows 58 define the path taken by the particles through groove 53. The pressure difference between opening 55 and port 57 drives the collected particles through groove 53.

FIG. 9B shows an optional routing for the particles from port 57 into a radial shaft 59 to the central heating or cooling channel 61 that carries the fluid 51.

Alternate gear arrangements for rotating the cylinders are shown in FIGS. 10A and 10B.

In FIG. 10A, pinion gears 62-65 fixed to the ends of the cylinders are engaged by the inside teeth 66 of a ring gear 67. Teeth 68 about the outside surface of ring gear 67 are engaged by a drive gear 69. In this illustration the use of four cylinders is assumed.

FIG. 10B illustrates an alternate arrangement which may be more suitable for use with larger numbers of cylinders such as six. In this case the drive gear is a sun gear 71 which drives planet gears 72 which are affixed to the ends of the cylinders that are to be rotated.

FIG. 11 shows an exploded view of the dynamic screen 80 of the invention. Dynamic screen 80 comprises six helically corrugated cylinders 81-86 with sinusoidal contours, a bearing plate 87, drive gears including a sun gear 88 and six planet gears 91-96, drive shaft 97, plate connectors 98, gear cover 99, and process connector plate 101.

The six cylinders 81-86 are supported, preferably at both ends by bearings mounted in bearing plate 87 and process connector plate 101. The ends of the cylinders have shaft extensions 102 which carry the bearings 91-96 at the rear and similar bearings (not shown) at the forward ends. At the rearward ends the shaft extensions 102 are engaged by the planetary gears 91-96. The planetary gears are engaged by sun gear 88 which is carried and driven by drive shaft 97. Drive shaft 97 may be adapted to be driven from either end but preferably from the rear so as not to interfere with the forward process inlet port 103.

Gear cover 99, bearing plate 87 and the process connector plate 101 are provided with three mounting holes each. To secure the gear cover, bearing plate and process connector plate together, three bolts 104 are passed through the three mounting holes 105 of gear cover 99 and through the aligned three mounting holes 105 of bearing plate 87. After passing through the holes 105 of bearing plate 87 the threaded ends of bolts 104 are threaded into the rearward ends of three plate connectors 98. The three holes 105 of process connector plate 101 are then aligned with the forward ends of the three plate connectors 98. Three bolts 106 are then passed through the three holes 105 of process connector plate 101 and threaded into the forward ends of plate connectors 98 to complete the assembly.

In the operation of the dynamic screen 80, the product to be screened, such as ground meat, enters under pressure at the forward end of process connector plate 101 through a pipe that is threaded into its threaded opening 107 of port 103. The ground meat or other product passes through the spaces between the cylinders 81-86 leaving behind bone fragments or other undesired particles that are too large to pass through. The retained or collected particles are moved by the helically corrugated rotating cylinders to the rearward ends of the cylinders where they are collected by one of the means described earlier and are exhausted through exhaust ports 108 provided about the periphery of bearing plate 87. The screened product that passes through the cylinders 81-86 is deposited upon a container mounted below the cylinders.

An effective screening mechanism is thus provided in accordance with the stated objects of the invention and although but a few embodiments of the invention have been illustrated and described, it will be apparent to those skilled in the art that various changes and modifications may be made therein without departing from the spirit of the invention or from the scope of the appended claims.

What is claimed is:

1. A dynamic screen for removing cartilege, gristle and bone fragments from a soft pliable meat product comprising:
   at least a pair of rotating cylinders each having a helically corrugated surface,
   said cylinders being arranged about a central opening in a parallel orientation to form a constant fixed space between said cylinders as they rotate,
   said cylinders being rotated in the same direction,
   whereby when said soft pliable meat product passes between said cylinders any cartilege, gristle and bone fragments of said product too large to pass through said space are retained by the cusp formed by said cylinders and moved to one end thereof by ridges of said corrugated surface for removal thereof.

2. The dynamic screen set forth in claim 1 in further combination with:
   means located at said one end for removal of any cartiledge, gristle and bone fragments collected.

3. A dynamic screen for removing cartiledge, gristle and bone fragments from a soft pliable ground meat product, said dynamic screen comprising:

at least a pair of parallel, closely spaced rotating cylinders arranged about a central opening, said cylinders having helically contoured surfaces, a first means for rotating all of said cylinders in the same direction, the helical contours of said cylinders having a periodic form with alternating positive and negative displacements, the adjoining contours of adjacent cylinders being displaced 180 degrees from each other in order to provide a uniformly narrow space between said rotating cylinders, a second means located at one end of said cylinders for removing the collected fragments of the product that are too large to pass between said cylinders, whereby ridges of the contoured surfaces of said cylinders moving steadily toward said one end of said cylinders as said cylinders are rotated carry the fragments of the product to said second means.

4. The dynamic screen set forth in claim 4 wherein: said first means rotates all of the said cylinders in the same direction at the same speed of rotation.

5. The dynamic screen set forth in claim 4 wherein: said cylinders comprise four in number, and said pliable product is forced longitudinally through said central opening and is discharged laterally thereof at predetermined points of said cylinders.

6. The dynamic screen set forth in claim 4 wherein: said cylinders comprise four in number, and said pliable product is forced between said cylinders longitudinally thereof and is discharged axially of said central opening.

7. The dynamic screen set forth in claim 5 wherein: said cylinders comprise six in number.

8. The dynamic screen set forth in claim 6 wherein: said cylinders comprise six in number.

9. The dynamic screen set forth in claim 4 wherein: said cylinders each have a sinusoidal contour.

10. The dynamic screen set forth in claim 4 wherein: the soft pliable product moves from said space outwardly of said rotating cylinders.

11. The dynamic screen set forth in claim 4 wherein: the soft pliable product moves from outwardly of said cylinders toward said space.

12. The dynamic screen set forth in claim 4 wherein: said second means comprises a spring loaded valve for removal of the fragments of said product.

13. The dynamic screen set forth in claim 4 wherein: said second means comprises an annual groove around each cylinder at a common end thereof for removal of collected fragments of said product.

14. The dynamic screen set forth in claim 4 wherein: said second means comprises a cavity formed in each of said cylinders at said one end thereof, a valve mounted in each cavity spring biased to close the associated cavity, the spring bias of each valve being overcome to open the associated cavity to collect said fragments of said product carried thereto by said cylinders by the pressure of said pliable product moving between said rotating cylinders and biasing the valve to close the associated cavity and expel said fragments of said product when the cavity is exposed to a lower pressure.

15. The dynamic screen set forth in claim 14 wherein: said lower pressure comprises atmospheric pressure.

16. The dynamic screen set forth in claim 14 wherein: said lower pressure comprises a pressure less than the pressure of said pliable product moving through said cylinder.

17. A method for removing cartiledge, gristle and bone fragments from a soft pliable meat product comprising the steps of:

forcing said product laterally through a pair of parallelly disposed bodies rotating in the same direction, said pliable portion of said product deforming as it passes through the space between said bodies leaving any cartiledge, gristle and bone fragments of said product at the cusp of said bodies, said bodies moving said fragments to one end thereof upon rotation thereof, and removing said fragments from said one end thereof.

18. A method for removing relatively hardened fragments from a soft pliable product comprising the steps of:

extruding said product laterally through a given space between a pair of parallelly disposed cylinders rotating in the same direction, said pliable portion of said product temporarily deforming as it passes through said space between said cylinders leaving any hardened fragment at the cusp of said cylinders, said cylinders moving said hardened fragments to one end thereof upon rotation thereof, and removing said fragments from said one end thereof.

19. The method set forth in claim 18 wherein: said fragments of said product comprise bone, cartiledge and gristle portions of said product.

20. The method set forth in claim 18 wherein: said rotating cylinders have a helically corrugated surface.

* * * * *

UNITED STATES PATENT OFFICE
CERTIFICATE OF CORRECTION

Patent No. 4,930,189        Dated  June 5, 1990

Inventor(s)  Sylvester L. Woodland

It is certified that error appears in the above-identified patent and that said Letters Patent is hereby corrected as shown below:

Claim 4, line 1, after "claim" delete "4" and substitute ---3---.

Signed and Sealed this

Thirteenth Day of August, 1991

Attest:

HARRY F. MANBECK, JR.

*Attesting Officer*        Commissioner of Patents and Trademarks